US006112984A

United States Patent [19]

Snavely

[11] Patent Number: 6,112,984

[45] Date of Patent: Sep. 5, 2000

[54] ELECTRONIC WALLET OR PURSE WITH MEANS FOR FUNDS TRANSFER

[76] Inventor: John D. Snavely, Mastin Lake Station, 3516 Maggie Ave., Huntsville, Ala. 35810

[21] Appl. No.: 09/332,205

[22] Filed: Jun. 12, 1999

Related U.S. Application Data

[63] Continuation-in-part of application No. 08/837,496, Mar. 14, 1997, abandoned.

[51] Int. Cl.[7] ........ G06F 17/60

[52] U.S. Cl. ........ 235/379; 235/381; 235/472.01; 902/40; 340/825.33; 340/825.35

[58] Field of Search ........ 235/379, 380, 235/381, 383, 472.01; 902/25, 26, 27, 40; 340/825.33, 825.35

[56] References Cited

U.S. PATENT DOCUMENTS

| | | | |
|---|---|---|---|
| 4,007,355 | 2/1977 | Moreno | 235/379 |
| 4,305,059 | 12/1981 | Benton | 235/379 X |
| 4,454,414 | 6/1984 | Benton | 235/379 |
| 4,877,950 | 10/1989 | Halpern | 235/487 |
| 5,055,660 | 10/1991 | Bertagna et al. | 235/375 X |
| 5,208,446 | 5/1993 | Martinez | 235/380 |
| 5,221,838 | 6/1993 | Gutman et al. | 235/379 |
| 5,294,782 | 3/1994 | Kumar | 235/380 X |

*Primary Examiner*—Michael G Lee
*Attorney, Agent, or Firm*—Mark Clodfelter

[57] ABSTRACT

An electronic money storage and transfer system wherein at least electronic money is transferable between a centralized repository of money containing at least one financial account accessible by an account identification number. The portable electronic wallet including a dedicated modem for accessing the financial account in the financial institution and a telecommunications receptacle for receiving a telecommunications plug for connecting the portable electronic wallet to the other electronic money storage and a plurality of portable electronic money transfer devices.

20 Claims, 10 Drawing Sheets

ELECTRONIC WALLET OR PURSE WITH MEANS FOR FUNDS TRANSFER

CONTINUING APPLICATION DATA

This application is a continuation-in-part of patent application Ser. No. 08/837,496, filed Mar. 14, 1997 now abandoned.

FIELD OF THE INVENTION

This invention relates generally to money transfer systems, and particularly to an electronic money transfer system including an electronic wallet for storing, in a secure manner, information related to a number of financial transactions in addition to a readily accessible, predetermined quantity of funds.

BACKGROUND OF THE INVENTION

In our present currency system in this country, Federal Reserve Notes are used as currency, or legal tender, to pay debts, bank drafts, checks and other forms of monetary transactions. Increasingly however, electronic transactions such as credit card transactions or debit card transactions are used in place of currency. In these electronic transactions, a card or similar device is used to generate a record of the transaction and apply a debit against the cardholder's banking or other financial account. However, credit cards, debit cards and currency are subject to theft and misuse by others. Accordingly, there is a need for an electronic wallet (or purse, hereinafter denoted for purposes of this invention as a "wallet") and associated system that can store financial information in addition to a quantity of money predetermined by an owner of the electronic wallet. Additionally, the wallet has means for transferring funds to/from other wallets or other devices adapted to receive or transfer such funds One reference, U.S. Pat. No. 5,221, 838, to Gutman, discloses an electronic wallet that may be used to implement a variety of financial transactions. In this device, the electronic wallet in conjunction with a communications system is used to communicate with a central banking or other financial institution in order to debit a financial account of the user. As such, the wallet of Gutman is not a stand-alone device in that it requires the financial institution to be "on line" in order to complete a transaction and update a user's account. Additionally, the electronic wallet of Gutman includes a printer, bar code reader and a magnetic card reader and writer for reading and magnetically writing information related to owners of credit cards, debit cards, or the like.

While the wallet of Gutman may function according to its specifications, the electronic wallet of Gutman is inconvenient and cumbersome to use. Additionally, the electronic wallet of Gutman does not provide for an electronic wallet with means for funds transfer that an individual can easily operate to transfer money securely within the existing monatary system. Further, the system of Gutman, by requiring that the wallet thereof and a retailer be "on line" with a financial institution in order for a transaction to take place, is dependent on reliabilities of computers of the financial institution for transitions to take place. As is well known, banking computers are "down" with certain, almost predictable regularity. As such, the system of Gutman does not allow cash to circulate freely as in the traditional money system does where one individual can pay another individual and the other individual can then transfer that money or check record to another to pay debt, or for making purchases at vending machines equipped to interface with an electronic wallet of the present invention, taking out money orders, or elimination of ATM machines, attendants at toll booths, pay telephone stations, etc.

Accordingly, it is a primary object of the instant invention to provide an electronic wallet with means for funds transfer that is a stand-alone repository of electronic money connectable to a wide variety of electronic money exchange devices without having to be "on line" with a financial institution during a transaction. The wallet is connectable to a bank or other financial institution via telephone service for the purpose of replenishing electronic money reserves in the wallet. Additional objects will become clear upon a reading of the following appended specification and drawings.

DETAILED DESCRIPTION OF THE DRAWINGS

Figure 1:
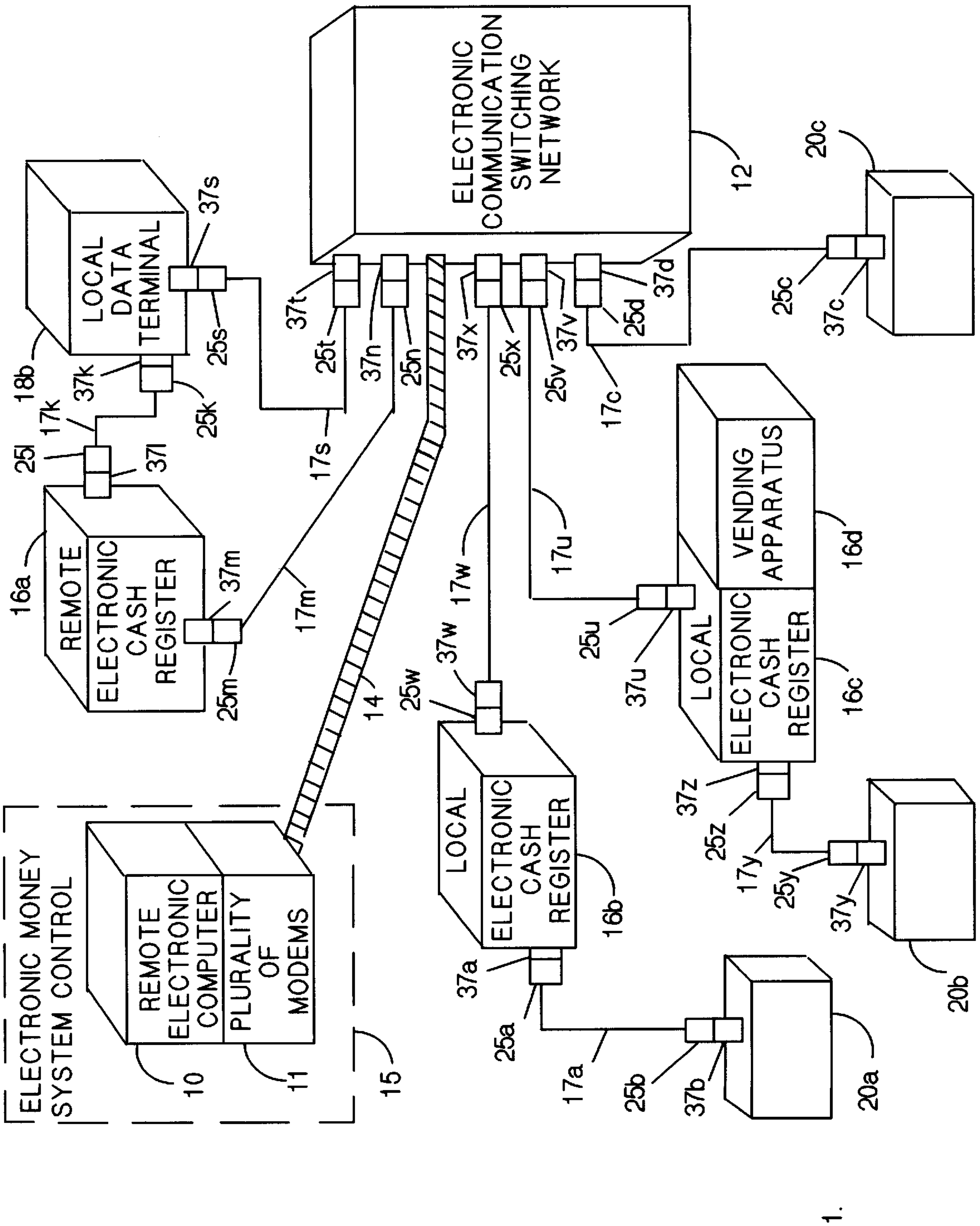
FIG. 1 is a perspective view of the principal electronic money system in its use configuration.
Figure 2:
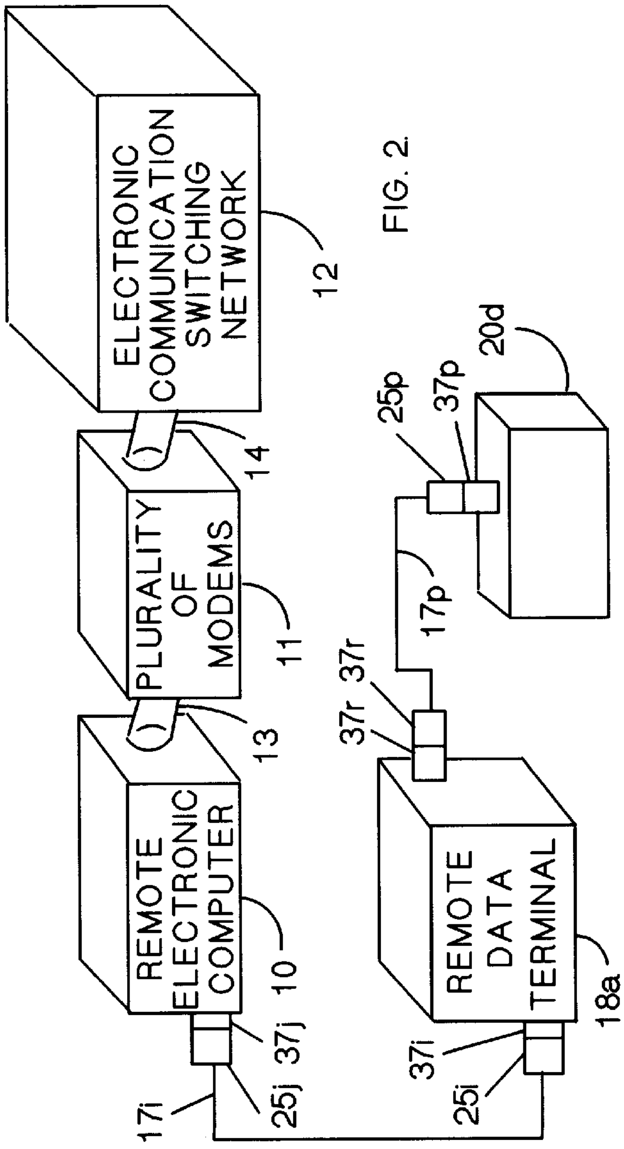
FIG. 2 is a perspective view of the principal electronic money system control apparatus in its use configuration.
Figure 3:
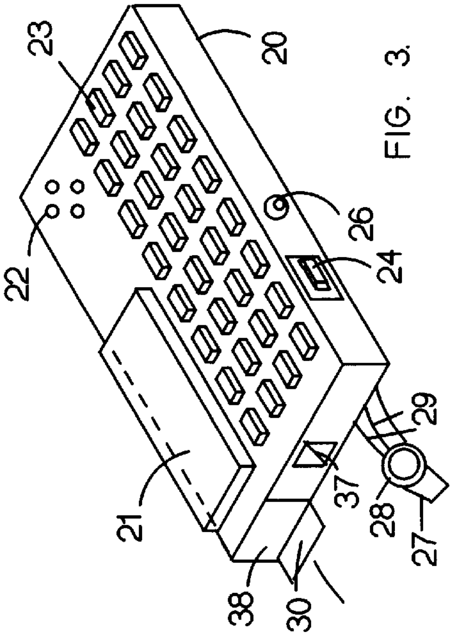
FIG. 3 is a perspective view of the wallet in its use configuration.

Referring initially to FIG. 1, the entire system of the present invention is shown. Here, an electronic money system control 15, which may be located in a bank, credit union or other financial institution, includes at least one remote computer 10 in turn conventionally coupled to a plurality of modems 11. Money and credit account records established at the institution are conventionally stored in computer 10, and accessed as needed by users of the system via a telephone service, which may include a telephonic electronics communications switching network 12, as will be explained. As shown in FIG. 2, computer 10 may be coupled by a cable 17*i* and associated jacks and plugs 25*j*, 25*i* and 37*j*, 37*i*, respectively, to a remote data terminal 18*a*, and by a multiconductor cable 13 to modems 11 which are in turn connected by a multiconductor cable 14 to an electronic communications switching network 12. Network 12 is connected by a cable 17*s* (FIG. 1) and associated jacks and plugs 25*s*, 25*t* and 37*s*, 37*t*, respectively, to a local data terminal 18*b*. In this example, terminal 18*b* may be connected to an electronic cash register 16*a* or an electronic wallet 20 of the present invention. In this example, local data terminal 18*b* may be at a point of sale for the wallets 20, with the wallets being activated through terminal 18*b*. Register 16*a* may be coupled to terminal 18*b* in order to activate register 16*a* for being put into service. Data terminals 18*a* and 18*b* are programmed to activate electronic wallets and cash registers. Also shown in FIG. 1 is an electronic wallet 20*a* connected to a local cash register as would be conventionally found in retail sales outlets, gasoline stations, etc. Here, when a purchase is made, wallet 20*a*, coupled to the register 16*b* by cable 17*a* and jacks 25*a*, 25*b* and plugs 37*a*, 37*b*, transfers the amount of the purchase from its electronic cash on hand memory storage registers to the cash register memory storage registers. This is facilitated initially by a conventional exchange of data (handshaking) between wallet 20*a* and register 16*b* to establish communications. After communications are established, the wallet transmits a check record, which may be identical to information on a check. This would include the payment identification number, which may be similar to a bank account number on a check, a check record number and the amount of purchase entered by an owner, and which may include the date the check record is entered, which is also transferred to the cash register. After identification is established, the electronic wallet transfers the amount of purchase to the register from the cash on hand storage. In the instance where wallet 20*a* is being used as a credit card, the register may conventionally call, via cable 17*w*, plugs 37W, 25*x* and jacks 25W, 37X, a central computer (not shown) to conventionally verify that the account in wallet 20*a* is a valid account. If cash on hand is insufficient, or if a credit limit has been reached, then no transfer will take place, and an indication of such will be provided on a message window of the wallet. Where the account is valid, the user of the wallet may connect the wallet, via telephone lines (or any other telephonic transmission system) and associated switching network to computer 10 and withdraw electronic money therefrom, which is stored in memory registers of the wallet.

In the example shown by wallet 20*b*, the wallet 20*b* is shown coupled to an electronic cash register 16*c* with attached vending apparatus 16*d*, such as a coffee or other beverage machine, snack machine, etc. Vending machine 16*d* may in turn be coupled by register 16*c*, cable 17U, plugs 25U, 25V and jacks 37U and 37V to a central vending computer via telephone service in order to indicate when a particular vending machine needs to be serviced or repaired. Additionally, records associated with electronic money transitions made with the wallet 20 of the present invention or other devices may be transmitted to the central computer at this time or at other predetermined times. Also, software may be provided in register 16*c* (or any electronic wallet 20) to allow a user of an electronic wallet to connect through the telephone service to his/her financial institution account in order to withdraw electronic money or renew credit.

In the example shown by wallet 20*c*, Electronic wallet 20C is shown coupled directly to electronic communications switching network 12, which in turn allows coupling of the wallet to computer 10 in the financial institution. In this instance, money may be withdrawn or deposited by the wallet from/to computer 10. Additionally, wallet 20*c* as shown may be used to connect to a remote electronic cash register, such as register 16*a*, in order to make purchases such as mail order purchases or otherwise transfer electronic money to register 16*a* or another wallet 20*c* (not shown).

Figure 8:
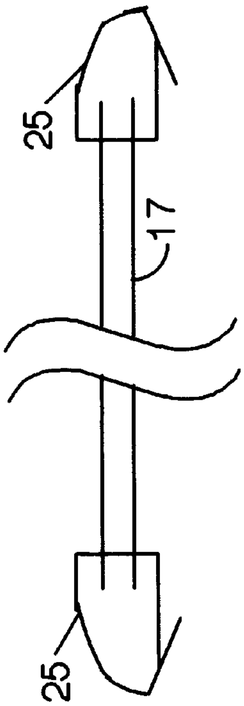
FIG. 8 is a detailed view of the cable used to connect the individual line communications of the principal components of the electronic money system.

While in the above example the wallets are shown coupled to electronics cash registers, data terminals and the like, it is emphasized that the wallet of the present invention is extremely versatile, and should be connectable, as by a conventional telephone cord as shown in FIG. 8 (or any other connection means designed for repetitive use) to any device having a capacity to transmit/receive electronic money. Further, the wallets are connectable to each other so that a user of one wallet may transfer money directly to a user of a second wallet.

Figure 4:
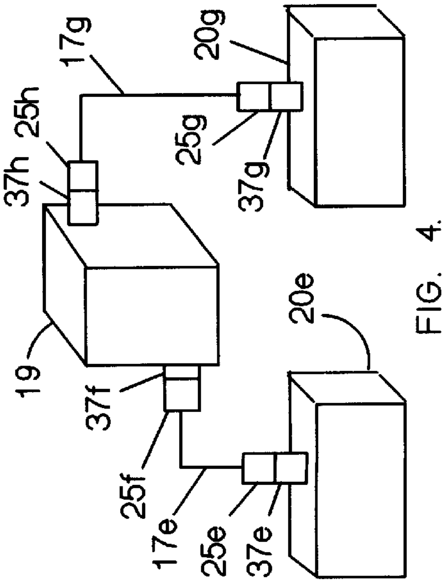
FIG. 4 is a perspective view of two of the principal electronic money subsystem apparatus connected to an electronic communications switching network line simulator in its use configuration.
Figure 5:
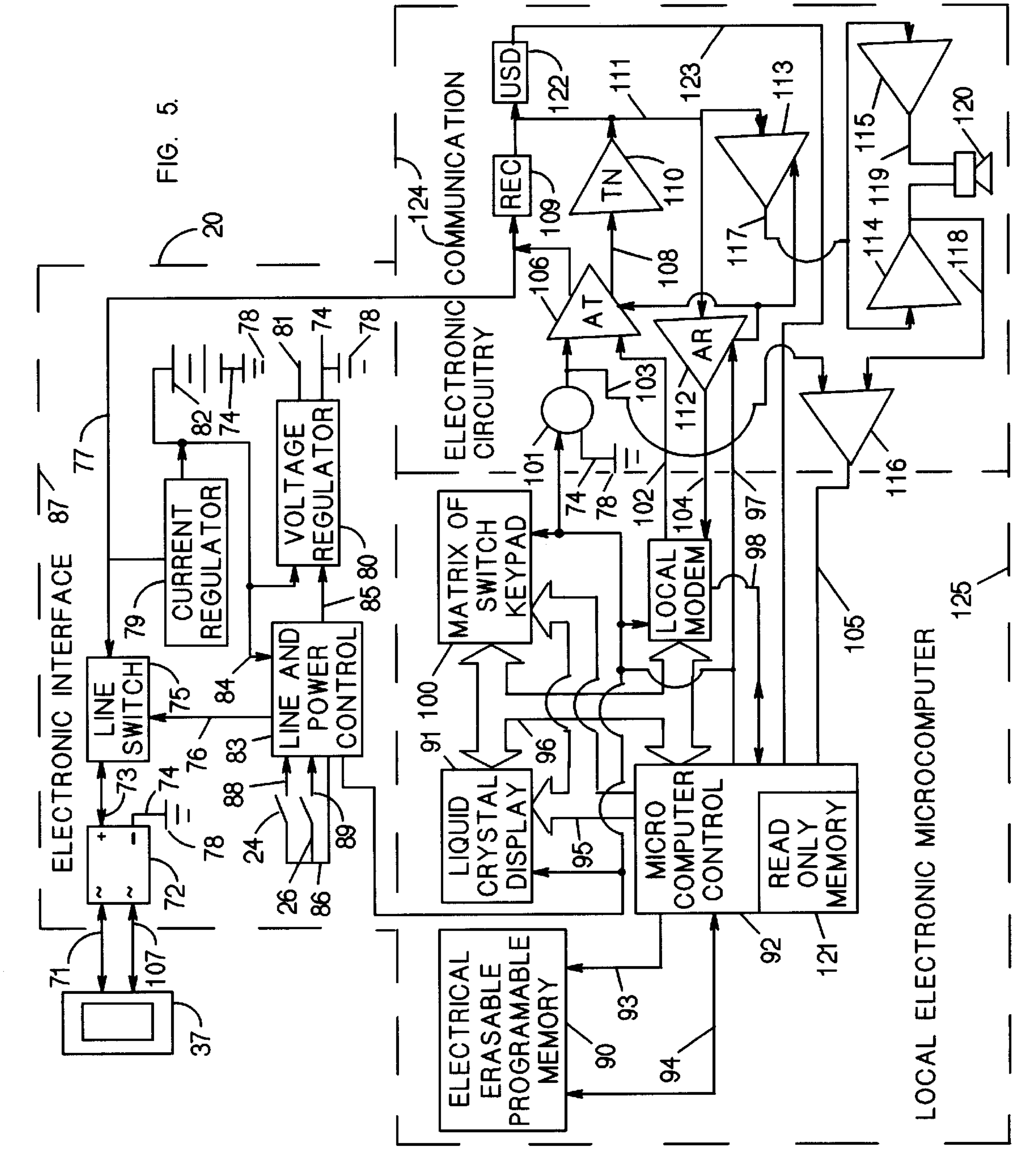
FIG. 5 is a schematic representation of the electronic control means of the electronic money subsystem apparatus of the instant invention.
Figure 6:
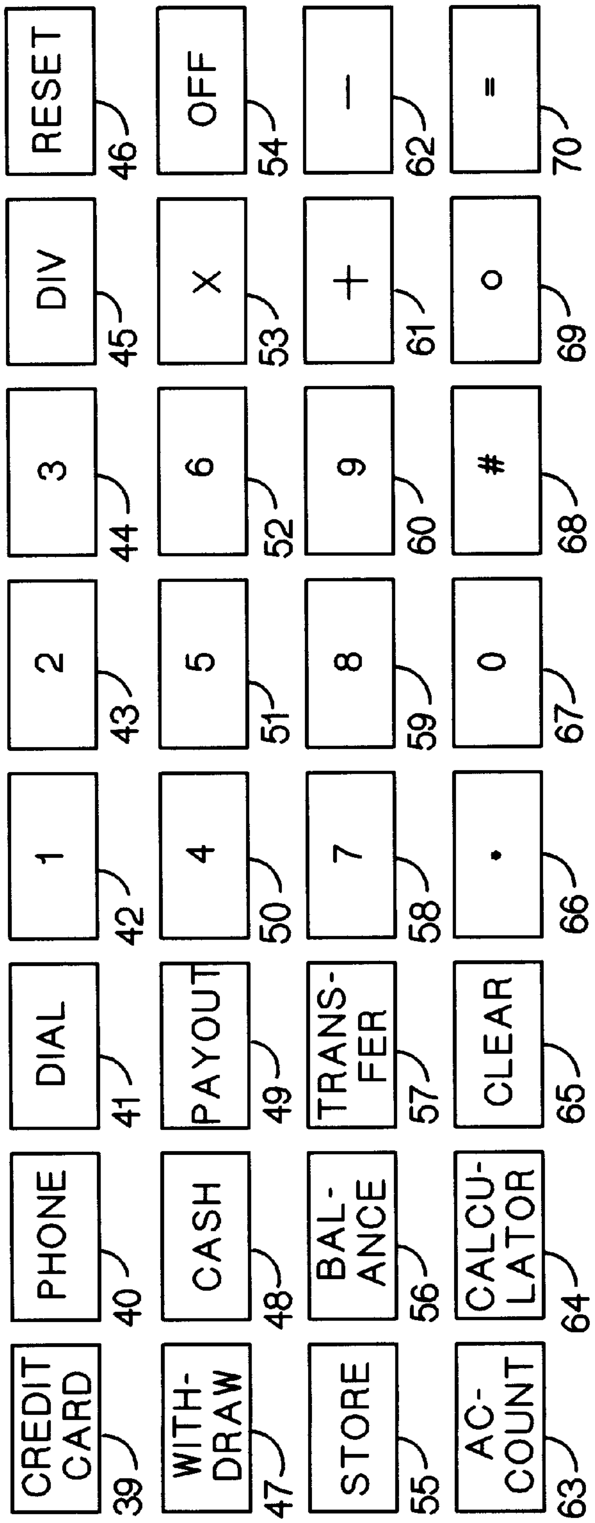
FIG. 6 is a detailed view of the selection actuator matrix of the keypad switches of the wallet.
Figure 7:
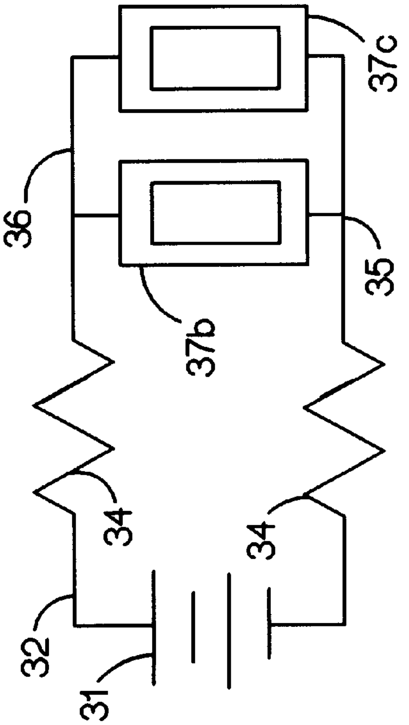
FIG. 7 is a schematic representation of the electronic means of the present electronic communications switching networks line simulator apparatus.

Electronic wallet 20 is shown in detail in FIGS. 4, 5 and 6. Here, wallet 20 includes a Local Electronic Microcomputer Section 125, Electronic Interface Section 87 and an Electronic Communication Circuitry Section 124.

The Local Electronic Microcomputer Section 125 includes a microcomputer control unit 92 with read-only memory 121, an electrically erasable programmable memory 90, an LCD electronics 91 forming display 21, a matrix of switches keypad 100 forming keypad 23 and a modem 99. Microcomputer control unit 92 is coupled (connected) to the electrically erasable programmable memory 90 by a cable 93 and bidirectional cable 94. Microcomputer control unit 92 is connected to the LCD electronics 91, the matrix of switches keypad 100 and the modem 99 by control cable 95, microcomputer system control cable 97 and bidirectional data bus cable 96.

Modem 99 is typically used to convert digital data to analog data for transmitting data and analog to digital for receiving data and controlling such functions.

Memory 121 typically holds, in a non-volatile manner, program instructions to operate microcomputer 92. Programmable memory 90 is used to store data related to account information, credit information, available electronic money information, and other data as described above.

The Electronic Interface Section 87 includes an interface connector 37, bridge rectifier 72, line switch 75, current regulator 79, voltage regulator 80, battery 82, line and power control electronics 83, POWER ON switch 24 and HOOKSWITCH 26.

Internal battery power is coupled to wallet 20 from battery 82 to line and power control 83 and voltage regulator 80 via conductors 84, 74 and ground 78 and further to wallet power conductor 81. Power on is activated via conductors 86, 89 and closing POWER ON switch 24 to power control 83 which in turn applies a "turn on" signal to voltage regulator 80 via conductor 85.

A telephone line is coupled to wallet 20 by a telephone interface connector 37, which as stated may be a conventional modular receptacle, or alternately may be any other form of interface suitable for repetitive connections. These alternate connections may be in the form of light emitting diode transmitters and receivers (one in the wallet and one in the register or other device), fiber optic conductors or inductive coils.

Line power and telephone audio analog signal are coupled to wallet 20 by the interface connector 37 through a bridge rectifier 72 via conductors 71, 107, through electronic line switch 75 via conductors 73, 74, ground 78, to conductor 77. Line switch 75 is turned on during periods of transmission or reception by a signal on conductor 76 coupled to line and power control 83, which functions in conjunction with HOOKSWITCH 26 via conductors 86, 89, and POWER ON switch 24 via conductors 86, 88 to selectively apply power and signal path to wallet 20.

Line power is further coupled to current regulator 79 via conductor 77. Here power is combined with battery 82 power at conductor 84 when line switch 75 is turned on. Here the wallet determines how much external power it can use. Other forms of power supplied from external sources may be coupled by electromagnet means such as photovoltaic cells, high frequency waves, laser beam, etc. The current regulator 79 allows wallet 20 to be powered by available power on the telephone line, data terminal, line simulator, cash register or any other device the wallet is connected to, this power being limited on the telephone line to a range of about 23–85 milliamps. A voltage regulator maintains a constant voltage to power wallet 20, and a battery 82 provides power to wallet 20 to initiate external electrical connection, and to use built-in calculator and other functions when wallet 20 is not connected to external equipment with a power source. A conductor 97 coupled to microcomputer control 92 conveys a HANGUP signal and POWER OFF signal to power control 83.

The Electronic Communication Circuitry Section 124 includes a microphone 101, a transmit amplifier 106, a receive signal amplifier 109, a negative transmit amplifier 110, a unit signal detector 122, a receiver amplifier 112, audio signal conditioning amplifier 113, speaker driver amplifiers 114 and 115 and speaker 120 conventionally mounted in wallet 20, and line signal detector amplifier 116.

The telephone audio analog signal on conductor 77 is applied to receive amplifier 109 which conditions the input analog signal and applies the signal to unit signal detector 122, receiver amplifier 112 and conditioning amplifier 113 via conductor 111.

The unit signal detector 122 is a frequency detector used to maintain track of time and volume measurements. For instance, a gas pump may be configured to provide a tone, such as a 12 kHz tone (already used by telephone companies in Europe and South America) for every cent of gas pumped, with this tone detected by unit signal detector 122, which in turn provides a debit signal to microcomputer control 92 via conductor 123. Microcomputer control 92 tracks these debit signals and responds by transferring an appropriate quantity of money accordingly.

The received telephone signal is applied to conditioning amplifier 113 via conductor 111, in turn providing an output to speaker drivers amplifiers 114 and 115 via conductor 117. These amplifiers drive a speaker 120 via conductors 118 and 119. A signal from amplifier 114 is also applied to amplifier 116 via conductor 118, which is utilized to detect a received signal and provide an indication of such to microcomputer control 92 via conductor 105.

The received signal is also applied to analog receive amplifier 112 via conductor 111, which applies the received to local modem 99 via conductor 104. Modem 99 converts the analog signal to digital signal format appropriate for input to microcomputer control 92 via multiconductor cable 96.

During transmit mode of operation, a transmitted signal is initiated by microcomputer control 92, or when the user is making a telephone call by microphone 101. When microphone 101 is used for voice communication, an input from matrix of switches keypad 100, as where a user dials a telephone number, is applied to microcomputer control 92, which in turn develops appropriate touch tone control signals for transmission. These signals are applied to multiconductor cable 96 to local modem 99, which applies them via conductor 102 to transmit amplifier 106. From here, an inverted signal is applied to the negative transmit amplifier 110 via conductor 108 and a non-inverted signal is applied to receive amplifier 109 via conductor 77 and summed on conductor 111. This summing process of the transmitted inverted signal of amplifier 110 and non-inverted signal of amplifier 109 are such that a reduced signal is applied to speaker 120 so that a person talking into the microphone receives audio feedback through the speaker. The non-inverting signal, which includes touch tone signals and data representative of account information, credit information and cash transaction information is applied from amplifier 106 on conductor 77 to line switch 75 and then to bridge rectifier 72 via conductor 73, after which the signal is applied to the telephone line via interface connector 37.

When the transmit signal is voice, the signal is generated by microphone 101 and coupled via conductor 103 to transmit amplifier 106 to be transmitted to the telephone line and to the line signal detector amplifier 116. Amplifier 116 is used to detect voice transmit signals and provide indication of such to microcomputer control 92 via conductor 105.

When the transmitted signal is data, the signal is generated by modem 99 coupled via multiconductor cable 96 and under control of microcomputer control 92. The digital data signals are converted to analog data signals, which are applied to conductor 102 to transmit amplifier 106 to be transmitted to the telephone line.

The microphone 101, transmit amplifier 106, receiver amplifier 112 and audio signal conditioning amplifier 113 are enabled/disabled under control of microcomputer control 92 via control cable 97.

A program operates wallet 20 when power is applied from POWER switch 24.

The electronic memory used in this electronic wallet includes nonvolatile memory 121, one-time-programming OTP, EPROM, ROM or flash memory, alterable memory that may be electronically erasable programmable memory (EEPROM 90) and random access memory (RAM) constructed in microprocessor 92. The ROM and OTP cannot be changed, and the EPROM and flash memory can be changed only after it has been completely erased. The EEPROM memory can be changed one register at a time.

The ROM 121 or flash memory contains the operating program that performs the functions of the wallet, and also contains messages that will be displayed on the liquid crystal display (LCD 91) to give operational status and directives to the wallet operator. The displayable messages are explained and defined in the description of the functions below. Part of the EEPROM memory 90 is locked at the time the wallet is activated, and is not alterable by an owner of the wallet. A system agent will be able to alter this data, which contains a withdrawal account number, payouts or check issue account number and deposit account number that will be used to control account transactions. These numbers are used to issue the electronic money in the form of check records. The deposit account number can be the same as the check issue account number. A credit account number is used with issuing credit money. Personal information data such as birthdate is used for age discrimination purposes and names and addresses of an owner of the wallet. A key number functions as a PIN number (personal identification number) that acts as a combination lock, and controls access to all money and account operations. System phone numbers are used by the wallet to call the electronic money system control center to make money transfers to the wallet. Encryption codes are sent at the time the wallet is activated, and may be changed by a system iteration control function and will be used to encrypt sensitive data used in withdrawing money from an account in the financial institution. Another part of EEPROM memory 90 is locked at the time the wallet is activated, and is not alterable by an owner of the wallet. This part of EEPROM 90 may be altered during normal operations of money transfers by the wallet's program under control of system functions and contains an account balance amount of an owner's account that will be updated each time a withdrawal from or deposit to the account is made by the wallet. A cash on hand amount is an amount of money an owner has in the wallet at any point in time. This amount is updated each time a withdrawal from the account is made or a payout/check record is issued by the wallet to make a purchase or transfer money. Credit on hand amount is an amount limit of credit available in the wallet. This amount is updated each time a credit withdrawal from the credit amount is made or a credit payout/check record is issued by the wallet to make a purchase. Check records that are received by another electronic wallet are stored, and subsequently deposited in an owner's account or issued to a third party's electronic wallet or a cash register. Part of EEPROM memory 90 is alterable by an owner of the wallet, and contains non-system phone numbers. These numbers may be automatically dialed by the wallet when accessed by a user. Spare account memory is also provided, and may be altered by an owner to keep records relating to other accounts. Specific use of each of these memory allocations is discussed in the description below. MICROCOMPUTER CONTROL RAM 92 is used as working storage in conjunction with a program, with allocation of this RAM defined by program instructions.

Operation of the electronic money system is conducted by program instructions stored in respective memories of computer 10, wallet 20, cash register 16 and data terminal 18. After wallet 20 and cash register 16 are activated, an operator of wallet 20 and register 16, under program control, initiates all transactions and controls operation of transferring electronic money to and from itself. Register 16 has similar programming and acts similarly to wallet 20. Data terminal 18 is an agent of the financial institution and has a special program to carry out its function to activate wallet 20 and register 16. Operation of wallet 20 is of particular pertinence of this invention and the subject of the following description.

Wallet 20 is operated by keypad switches 23, which include switch 24 and HOOKSWITCH 26. Key and functions selections shown in FIG. 6 are: "0" 67, "1" 42, "2" 43, "3" 43, "4" 50, "5" 51, "6" 52, "7" 58, "8" 59, "9" 60, "*" 66, "#" 68, "+", 61, "−" 62, "X" 53, "DIV" 45, "." 68, "=" 70, "RESET" 62, "OFF" 54, "CREDIT CARD" 39, "PHONE" 40, "DIAL" 41, "WITHDRAW" 47, "CASH" 48, "PAYOUT" 49, "STORE" 55, "BALANCE" 56, "TRANSFER" 57, "ACCOUNT" 63, "CALCULATOR" 64 and "CLEAR" 65.

Wallet 20 displays directive messages "SELECT FUNCTION ENTER/KEY NUMBER", "ENTER TELEPHONE NUMBER", "ENTER ADDRESS" and "ENTER DATA". Status messages are also displayed, these including "TRANSITION COMPLETED", "TRANSITION NOT COMPLETED", "ACCOUNT DEPELETED", "KEY NUMBER ERROR", "NEGATIVE NUMBER CANNOT STORE", "ERROR", "BAD PHONE LINE", "INSUFFICIENT", "LOCK OPEN", "CASH ON HAND", "PAYOUT AMOUNT", "WITHDRAWN AMOUNT", "ACCOUNT BALANCE", "WALLET BALANCE" and "INCORRECT". In addition, function messages are displayed, these including "TELEPHONE", "CALCULATOR", and "ACCOUNT OPERATION". These messages are called and displayed as needed by the program instructions.

Operation of the money system apparatus begins by establishing money and credit accounts in the electronic money system control apparatus 15 and activating wallets 20 and registers 16. Establishing accounts and activating wallets 20 and registers 16 is accomplished by using a terminal 18. This account-establishing action may be done at a local terminal **18*b* where a terminal is in a retail store connected by cable 17*s* and associated jacks and plugs 37S, 37T and 25S, 25T, respectively. These jacks and plugs are connected through network 12, multiconductor cable 14, modems 11 and multiconductor cable 13 to computer 10, or a remote terminal 18*a* where the terminal is at computer 10 and connected by cable 17I and associated jacks and plugs 37I, 37J and 25I, 25J**, respectively.

Establishing individual money and credit accounts therein is accomplished by connecting a wallet 20 or a register 16 via cable 17 to terminal 18 and entering, by of agent of the financial institution, for each individual account, a deposit money and/or credit identification number, a withdrawal money and/or credit identification number, a payout money and/or credit identification number, a key number, deposit and credit accounts, the owner's name, address and birth date. This data is entered via terminal 18 which transmits the data as individual account records to computer 10 and wallet 20, or register 16 for storing and initializing the device. Wallet 20 and register 16 have a function in their programs to make this setup possible and accessible only by the financial institution agent. The wallet 20 or register 16 only need to be connected to terminal 18 via cable 17 and have POWER switch 24 pressed to turn on power, and HOOKSWITCH 26 pressed to make electrical connection with a telephone line or other telephone service.

Once wallets 20 and register 16 are activated, all money transactions may be conducted with wallet 20. An operator of wallet 20 connects to a local register **16*b* or 16*c* via 17*a* or 17*y*, or a telephone service 17*c* when computer 10 or remote register 16*a* are accessed. When money is transferred between wallets, a line simulator 19 connected to line 17*e* and respective plugs and jacks are used to simulate a telephone line load. The user powers the wallet by pressing POWER switch 24, and makes electrical connection with the telephone line simulator by pressing HOOKSWITCH 26. The wallet initially displays SELECT FUNCTION/ENTER KEY NUMBER on LCD 21. The matching key number stored in EEPROM 90 is entered on keypad 23, and the wallet 20 displays LOCK OPEN, SELECT FUNCTION/ENTER KEY NUMBER to unlock the money access functions of wallet 20, or KEY NUMBER ERROR. If there is a key number error, the operator may press the POWER switch 24 or the RESET switch 46 to reset wallet 20** to an initialized state in order for a user to enter the key number again. An operator may then select the type of transaction he/she wishes to make.

First, wallet 20 must withdraw money and/or credit from a financial institution. The withdrawal/deposit of this money operation function is used to accomplish this action by pressing the WITHDRAW key 47. Wallet 20 will then display ENTER ACCOUNT POSITION NUMBER, at which point an operator enters account position number (if the operator wants credit renewed an credit account position number is entered), after which the "=" switch is pressed. The wallet then displays a directive ENTER AMOUNT, prompting the operator to enter an amount, which is displayed, after which HOOKSWITCH 26 is pressed and a pause is initiated until a dial tone is received. When a dial tone is received DIAL switch 41 is pressed and the wallet will automatically dial the financial institution's phone number. Computer 10 answers the call and communications are established between computer 10 and the wallet. At this time the operator optionally tones the key number and transmits its payout or check issue number to computer 10. Computer 10 sends encryption instructions and when wallet 20 receives the encryption instructions it transmits the request for money or credit, makes deposits of received check records stored in memory, receives verification data and account balances, and updates cash-on-hand, credit limit-on-hand, account balance and credit balance storage, and deletes deposited received check records from the memory. Computer 10 sends an error message to indicate INSUFFICIENT FUNDS or KEY NUMBER ERROR which is displayed on LCD display 21, and BAD PHONE LINE is displayed if no connection is made. Wallet 20 may also display "TRANSACTION NOT COMPLETED" or "TRANSACTION COMPLETED".

When wallet 20 has cash-on-hand or credit-on-hand it can make payouts of money for purchases or simply make transfers of money. The payout operation of money to an electronic case register 16 or another wallet 20 is accomplished by connecting wallet 20 to register 18 or another wallet 20 through a telephone line simulator and pressing the PAYOUT or CREDIT CARD switches. Wallet 20 will then display ENTER ACCOUNT POSITION NUMBER, after which the operator enters cash or credit account position number and presses the "=" sign. In response, wallet 20 will display PAYOUT/ENTER AMOUNT. The operator enters the amount, which is displayed, and presses HOOKSWITCH 26, after which wallet 20 will display PAYOUT/ENTER AMOUNT. The operator then presses the TRANSFER switch 57. When money is transferred to another wallet 20, the other wallet 20 is made ready by pressing the TRANSFER switch 57. If unit signals are being used, an astric (*) is entered for the AMOUNT. The operation is now automatically completed, a money or check record is transferred and verified that it is transferred, and stored in register 18 or another wallet 20 as a received check record in EEPROM 90. The wallet 20 will subtract the cash payout from the cash on hand stored in memory or the credit limit and can also display TRANSACTION NOT COMPLETED or TRANSACTION COMPLETED accordingly.

The money record transferred includes a payout or check issue account number, a check number, and an electronic money amount. If unit signals are used, wallet 20 counts the discrete signals and verifies with register 16 the amount of purchase at the end of the measurement.

In order to make a pay phone call, the money access function is entered by entering the key code number. The wallet is connected to a phone line and the phone switch 40 is pressed. The telephone number to be called is then keyed into the wallet, after which "*" is pressed. The payout mode is entered by pressing "PAYOUT" switch 49 or "CREDIT CARD" switch 39, and a blank check record is transferred to the telephone company. After the call is completed, the time increment of the call is measured and verified, after which a money amount is applied to the transferred check record.

The calculator function, storing and displaying and altering of spare account information operations, along with storing and displaying of non-system phone numbers, may be used outside the money and credit functions. No access key number is needed to access these functions. Calculator functions are used by pressing the "CALCULATOR" switch 64, after which at least floating-point arithmetic, addition, subtraction, multiplication and division operations may be performed.

Figure 9A:
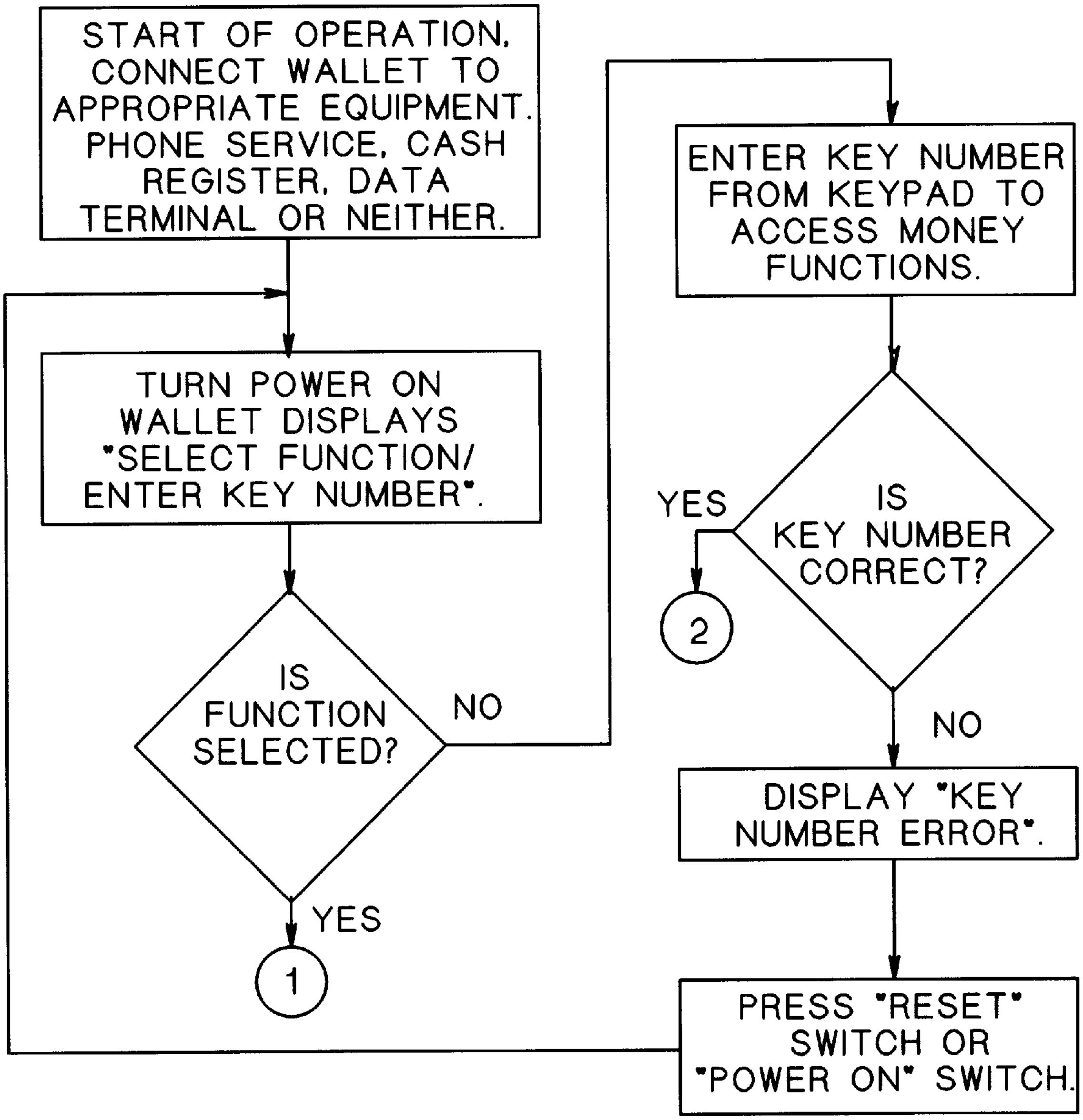
FIGS. 9*a*–9*o* are flowcharts illustrating operation, which may be implemented by software, of the present invention.
Figure 9B:
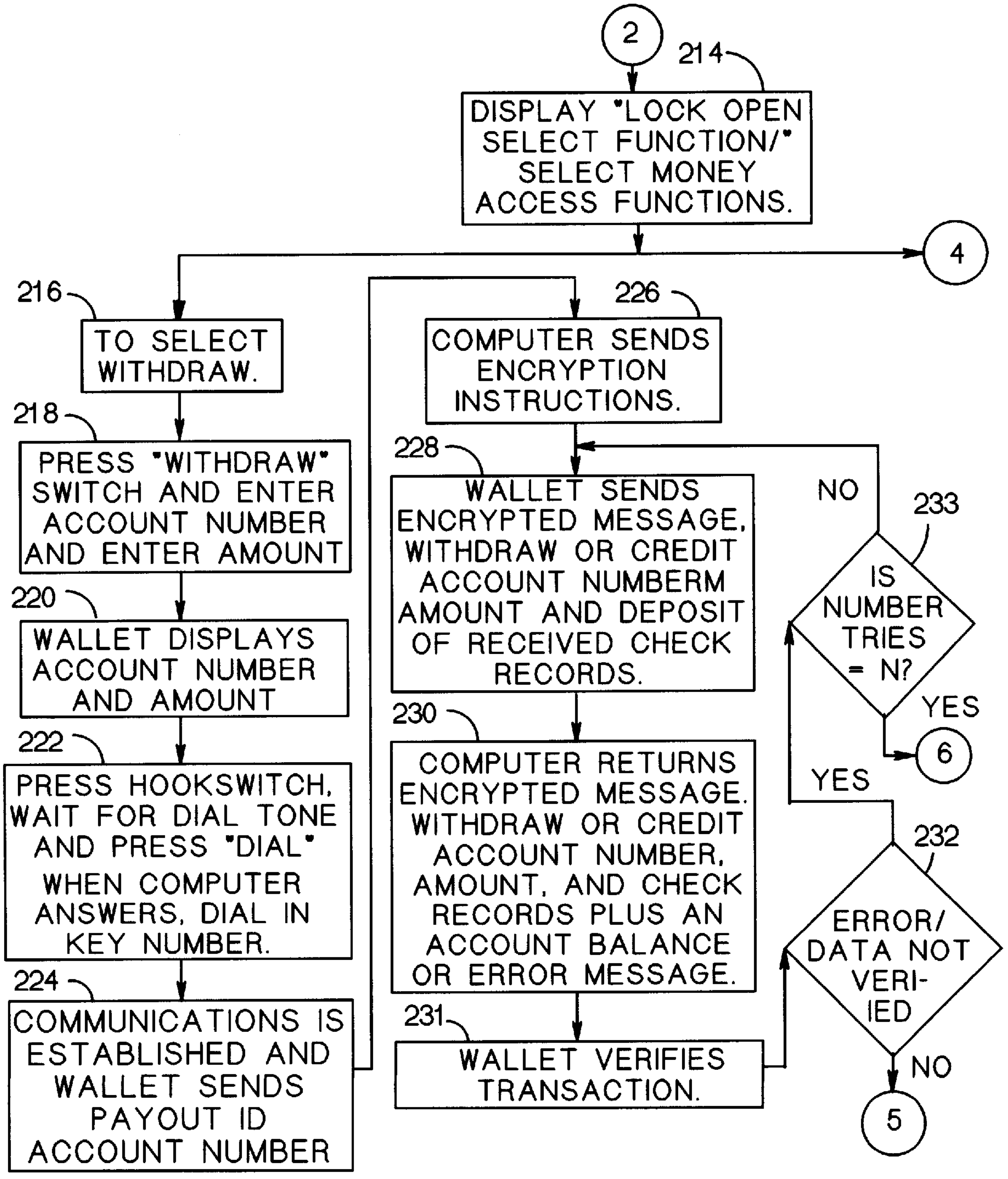
Figure 9C:
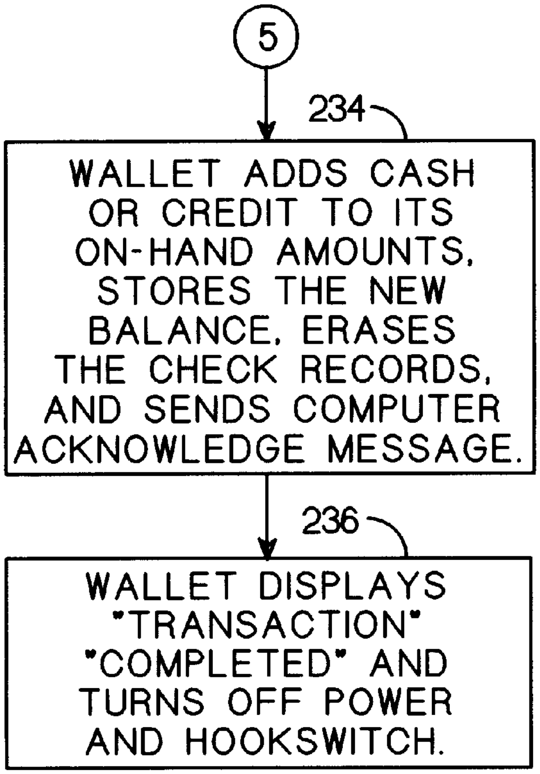
Figure 9D:
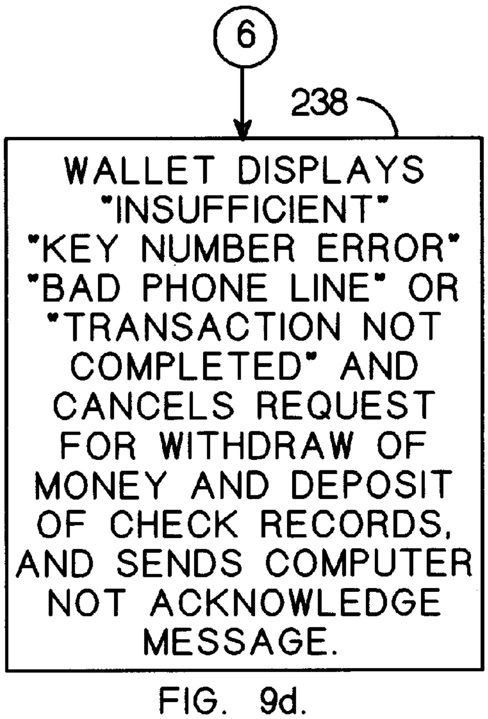

FIGS. 9*a*÷9*o* are flowcharts illustrating operation, which may be implemented by computer instructions, of a wallet 20. In FIG. 9*a*, box 200 shows a beginning operation thereof by connection of the wallet to a device to which electronic money is to be transferred. At box 202 the wallet is powered ON, initializing the various memory registers of the wallet to their various beginning values. At this point, the display is initialized to display the message SELECT FUNCTION/ENTER KEY NUMBER. At box 204 a test is made as to whether a function is selected, and if not, then operation proceeds to box 206 where the user enters a key number. As will be recalled, the key number is a security number similar to a personal identification number, and is required to be correctly entered in order for the user to access money functions of the wallet. At box 208 a test is made as to whether the key number was correctly entered, and if not, then operation proceeds to box 210 where a routine is called to display the message KEY NUMBER ERROR. At that point, and as shown at box 212 the user may press either the RESET or POWER ON switch to reset the wallet for the operation to loop back to box 202. Where the key number at box 208 is correct, then operation proceeds to box 214 (FIG. 9*b*) where LOCK OPEN/SELECT FUNCTION is displayed. At this point, money access functions may be selected. Operation at that point branches to a number of options depending on an entry made by the user. Where a withdrawal is made from the user's financial account and deposited in the wallet, as shown at box 216, the user selects the WITHDRAW key at box 218, and operation proceeds to box 220, where the wallet displays the selected account number and amount of electronic money to be withdrawn. The operator then presses HOOKSWITCH (box 222), waits for a dial tone and when such is received, the DIAL switch is pressed. When computer 10 at the financial institution connects with the wallet, and as an extra security measure, the key number may again be entered, and communications are established between the wallet and computer 10, as shown at box 224. Alternately, the requirement for entering of the key number at that point may be omitted. At this point, a payout account number is transmitted by the wallet, and at box 226 computer 10 transmits encryption instructions to the wallet. These encryption instructions may be in the form of a public key or private key system, or may further be an iteration scheme where bits of code replace, are added or subtracted to the encryption code key stored in the wallet. In response, the wallet transmits, at box 228, a message containing the encrypted withdrawal account number. For enhanced security, the withdrawal number may not be the same as the issue and deposit account numbers, and may only be known by computer 10 and a respective wallet. A different encryption code may be used in transmitting the amount of withdrawal to be made from computer 10. At this time, it would be possible to transfer or deposit in computer 10 any received check records. If known numbers other than the withdrawal number are to be encrypted, such as amount and check record account number, a different encryption key may be used. The computer then returns, in encrypted form, at box 230 a response containing the electronic money and the account number from which it is withdrawn, a balance remaining in the account at computer 10 and all deposited check records for verification that what was sent was actually received. This transaction is verified at box 231 by wallet 20. If an error occurs in transmission or if the account at computer 10 would be overdrawn, an error may be provided at that point. At box 232 a test is made as to whether an error was made or the transaction was not verified. If an error has occurred, then at box 233 operation loops back to box 228 for about 5 attempts or so in order to test verification or to clear the error. At box 233 a test is made as to whether the number of loops has been reached, and if the answer is yes, operation proceeds to box 238, where the wallet displays at least one of the shown error messages and the request for withdrawal is cancelled. A COMPUTER NOT ACKNOWLEDGE message is also transmitted to computer 10. If no error occurred at box 232, operation proceeds to box 234 of FIG. 9*c* where the wallet adds the withdrawn electronic money to its on-hand amount. This new balance is stored and the deposited check records are erased and an acknowledgement is returned to computer 10. Operation for the WITHDRAW function is completed at box 236 where the wallet displays TRANSACTION COMPLETED for a short time delay, which may be 2–5 seconds or so, during which the HOOKSWITCH is disconnected from the telephone service and after expiration of the time delay, the wallet turns itself off. Alternately at this point, the wallet may return to box 202 (FIG. 9*a*) and display the message SELECT FUNCTION/ENTER KEY NUMBER in case the user wishes to continue using the wallet.

Figure 9N:
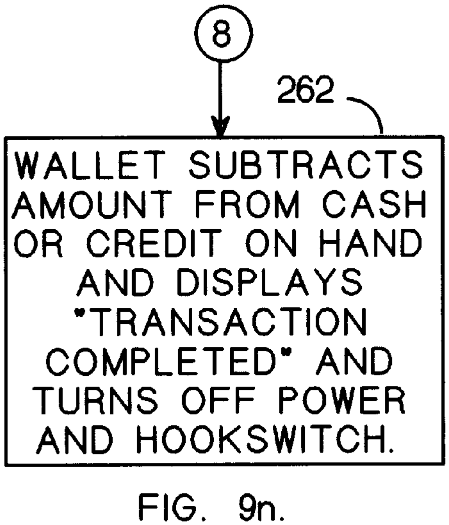
Figure 9O:
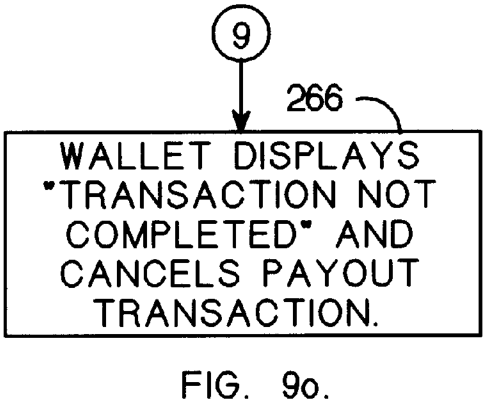
Figure 9M:
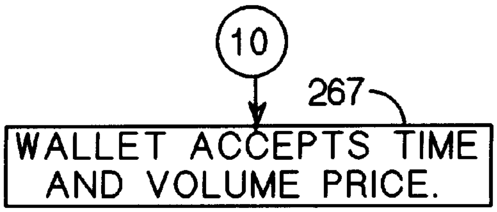
Figure 9E:
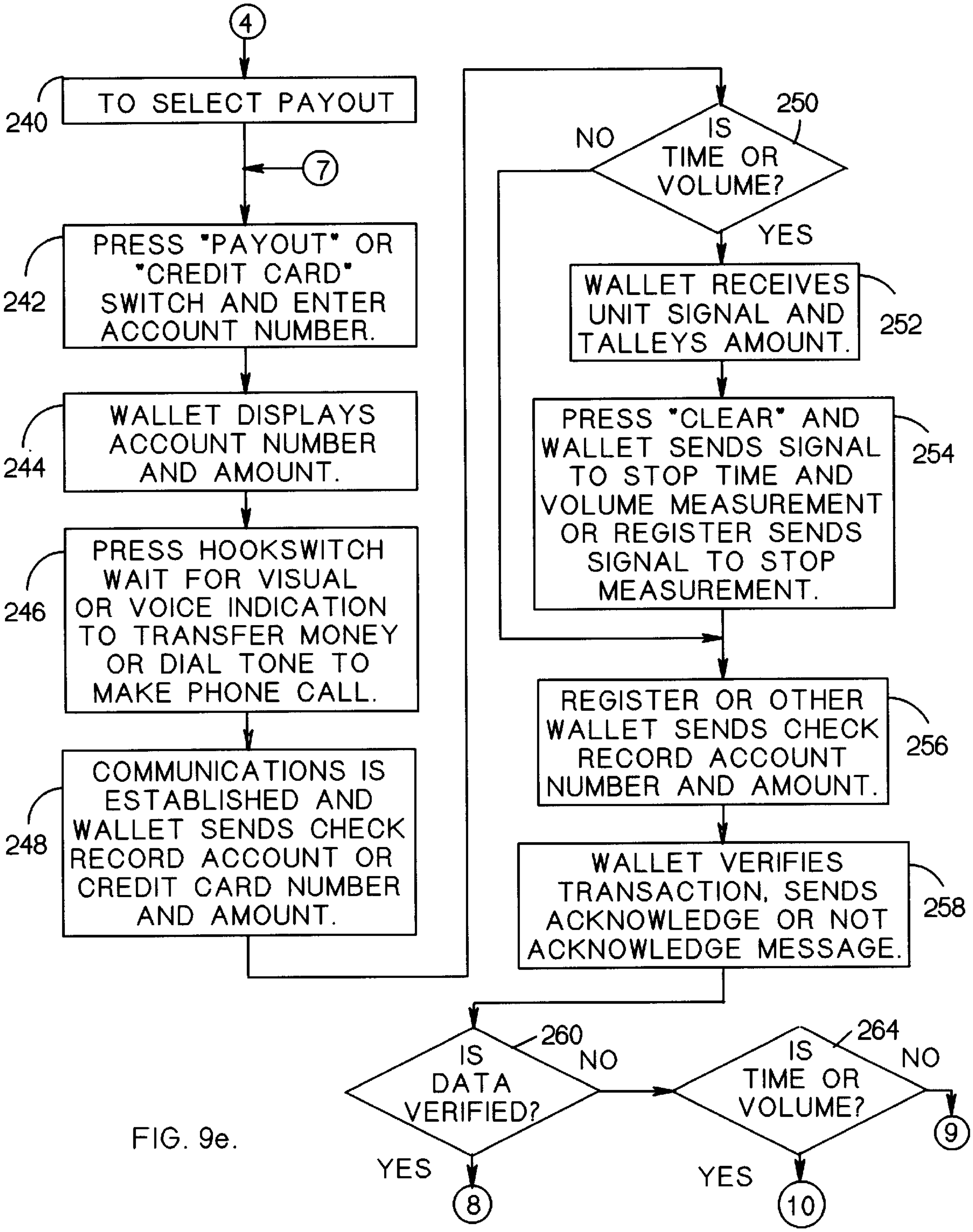
Figure 9F:
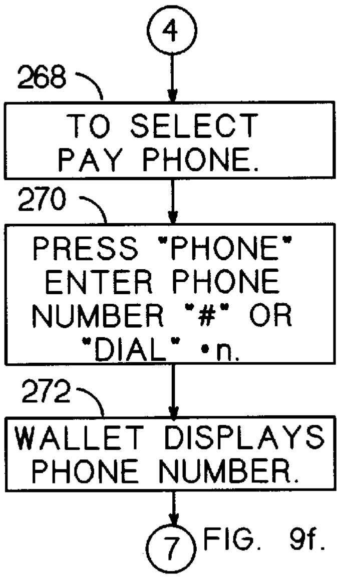
Figure 9G:
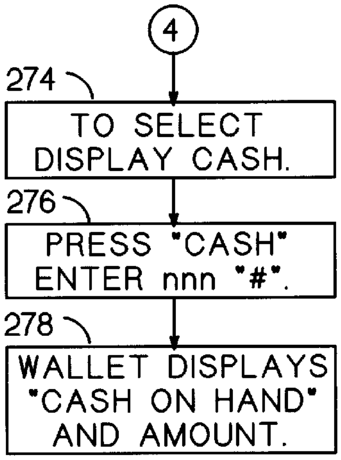

Operation of a PAYOUT function that may be selected at box 214 (FIG. 9*b*) is shown beginning at box 240 of FIG. 9*e*. Here, at box 242 either the PAYOUT or CREDIT CARD switch on the keyboard of the wallet is pressed, and the account number and amount of the payout is entered. At box 244 the account number and payout amount is displayed. At box 246 the user presses the HOOKSWITCH button, and the wallet waits for the operator to press the TRANSFER button. This would occur when the register establishes communication with the wallet, which may be indicated by a visual or tone indication provided by the register, or a voice indication given by a user of the register. Where the wallet is connected to a remote register via telephone service or to another wallet 20 via the line simulator, the indication may be given by a tone received by the wallet or a voice indication from the other user. When communications is established with a cash register or other similar device designed to interface with the wallet, (box 248), the wallet transmits the account number, which may be in the form of a check record, or a credit card number, and the payout amount. At box 250 a test is made as to whether a time or quantity measurement is being made, such as a purchase at a fuel station, and if the answer is yes, then operation proceeds to box 252, where the wallet receives the unit signals and sums the amount. At box 254 the operator may press the "CLEAR" switch, at which point the wallet sends a signal to terminate the time or quantity measurement, such as where a decision is made by the user to terminate operation of the pump. Where an individual fills a tank of fuel, the dispensing device typically would sense the full tank and terminate the flow, terminating the time and quantity signals to the wallet. At box 256, the register or other device transmits a check record account number and amount of purchase. At box 258 the wallet verifies the transaction and sends an acknowledgement. At box 260 the test is made as to whether the data is verified, and if so then operation proceeds to box 262 (FIG. 9*n*) where the wallet subtracts the purchase from the cash on hand or credit on hand and displays TRANSACTION COMPLETED for the described time delay and disconnects itself from the register or other device. The wallet at that point may or may not turn itself off, also as described. At box 260 if the answer is no, then at box 264 a test is made as to whether the purchase is a time or volume measurement, and if so then operation proceeds to box 267 of FIG. 9*m* where the wallet accepts the cost of the time or volume measurement from the associated register 16 and the discrepancy is displayed. At that point, a user may notify an attendant or the like associated with dispensing the time or volume measurement. If the answer at box 264 is no, then operation proceeds to box 266 (FIG. 9*o*) where the shown error messages are displayed and the payout is cancelled. At box 250, where the operation is not a time or quantity measurement the answer is no, then the operation proceeds to box 256 and continues as described.

Other operations that may be selected from box 214 (FIG. 9*b*) are shown in FIGS. 9*f*–9*k*. At FIG. 9*f*, in order to select a PAY TELEPHONE function as indicated at box 268, the PHONE button is pressed at box 270, after which a telephone number to be dialed is entered. At box 272, the telephone number is displayed, and operation proceeds to box 242 of FIG. 9*e*. At box 246 (FIG. 9*e*) when the dial tone is received, the number is dialed and operation proceeds as described for FIG. 9*e*.

In order to display cash on hand stored in the wallet (box 274 of FIG. 9*g*), the CASH button is pressed at box 276, and where there are multiple accounts, the account number or location is entered (nnn) and the pound sign (#) is pressed. In response, the wallet at box 278 displays CASH ON HAND and the amount of the cash on hand in that account.

Figure 9H:
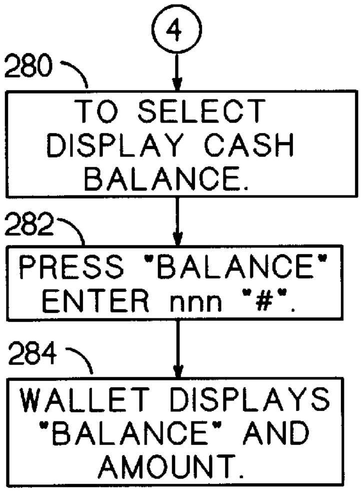

At FIG. 9*h*, in order to display the account balance in computer 10, a record of account balance is stored in wallet 20. At box 280 of FIG. 9*h* the balance is displayed. The BALANCE button is pressed at box 282 and where there are multiple accounts the account number (nnn) is entered and the pound sign (#) is pressed. In response, the wallet displays BALANCE and the amount of the balance in that account at box 284.

Figure 9I:
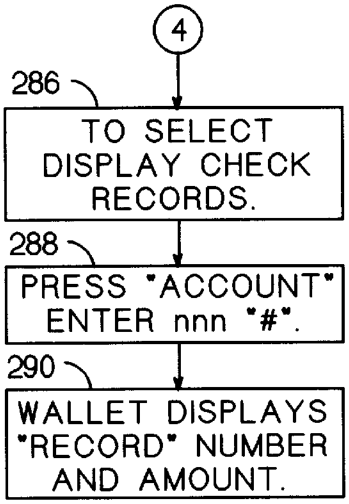

FIG. 9*i*, box 286 indicates operation to display a check record. At box 288 the ACCOUNT button is pressed, after which the position or location of the check record is entered (nnn) and the pound sign (#) is pressed. In response, the wallet displays RECORD and the associated check record amount.

Figure 9J:
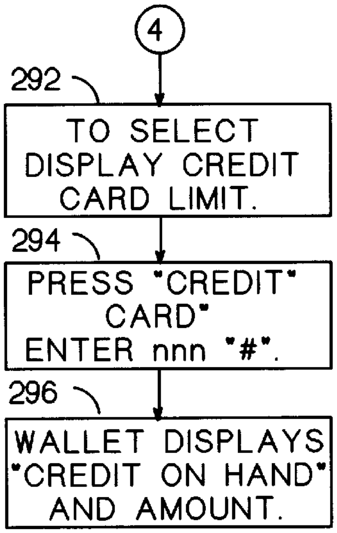
Figure 9K:
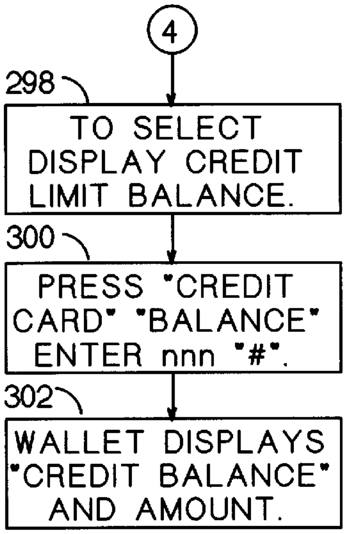
Figure 9I:
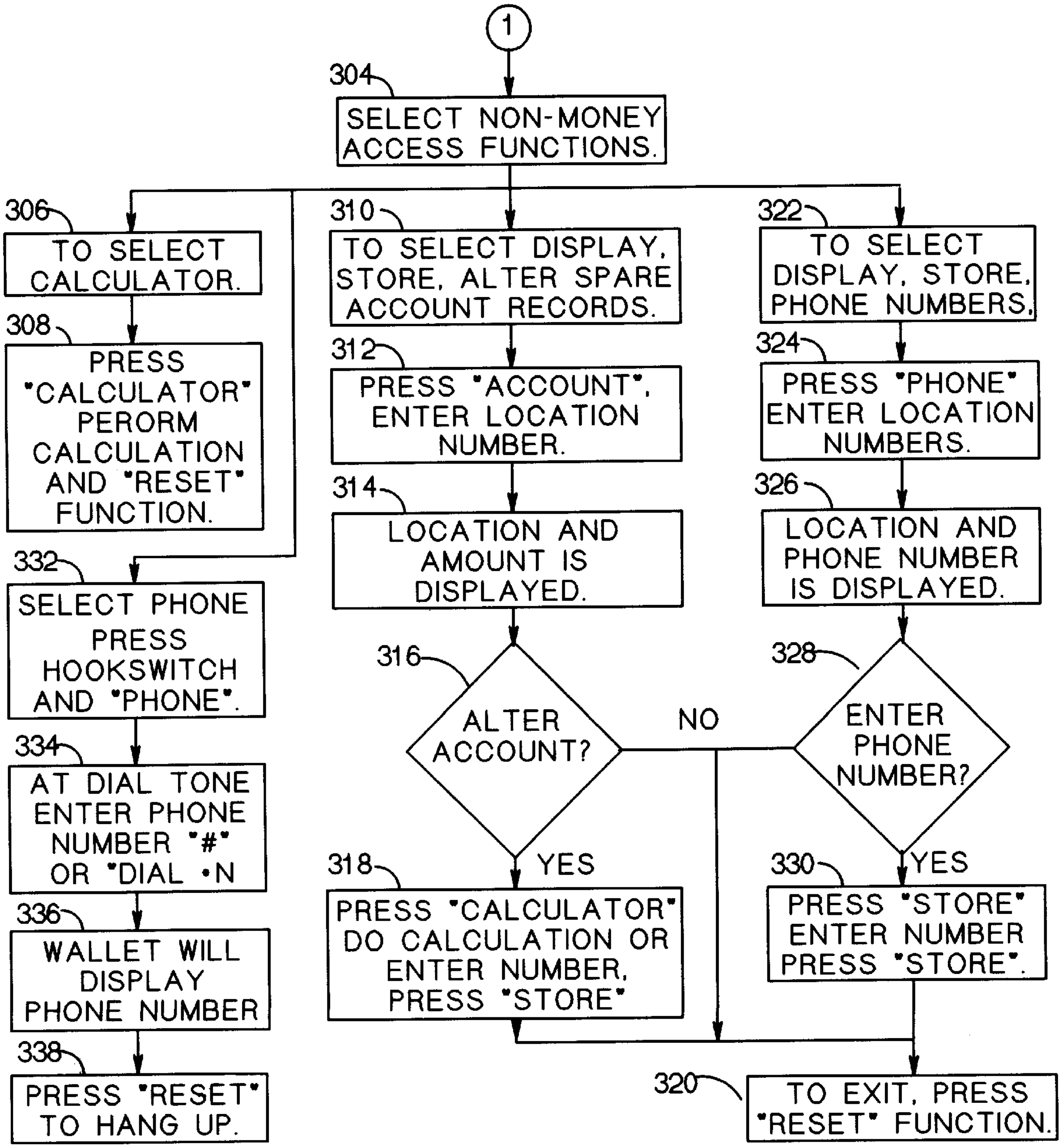

At FIG. 9*j*, box 292 the credit card limit is displayed by pressing the CREDIT CARD button at box 294, and where there are multiple credit accounts, the position of the credit card account (nnn), after which the pound sign (#) is pressed. In response, at box 296, the wallet displays CREDIT ON HAND and the amount of credit remaining in that account.

At box 9*k*, box 298 the credit account limit balance is displayed by pressing, at box 300 the CREDIT CARD button, and where there are multiple accounts, the credit card account position or location number is entered (nnn) and the pound sign (#) is pressed. In response, the wallet displays CREDIT BALANCE and the amount of credit balance at box 302.

At box 204 (FIG. 9*a*) where the answer is yes, indicating that a function is selected, operation proceeds to box 304 of FIG. 9*l* where non-money access functions are selected. At box 306 the calculator function is selected by pressing the CALCULATOR button at box 308, after which the calculator may be used. When the user is finished, the RESET button is pressed, resetting the wallet.

At box 310 information related to spare account information is accessed. At box 312 the ACCOUNT button is pressed and the location of the account is entered. At box 314 the location number and amount in the location is displayed. At box 316 a test is made as to whether the account is to be altered or new number entered, and if so then the CALCULATOR button is pressed at box 318. The account information is altered using the CALCULATOR functions, or a new number is entered. The altered or new number is stored in the spare account memory by pressing the STORE button. From either box 316 or 318 operation may be reset by pressing the RESET button at box 320.

At box 322 telephone numbers stored in the wallet may be stored, erased or altered. Here, at box 324 the PHONE button is pressed, after which the location number of the selected telephone number is entered. At box 326 the wallet responds by displaying the location number, and if there is a phone number then the number is displayed. At box 328 a test is made as to whether a telephone number is to be entered, and if so then operation proceeds to box 330 where the STORE button is pressed and the new telephone number is entered, and the STORE button is again pressed. After storing the number, operation exits as described at box 320.

Lastly, at box 332 (FIG. 9*l*) a non-pay telephone number may be selected. Here, at box 334 the HOOKSWITCH and PHONE button is pressed. When the dial tone is received the telephone number is entered. Where a number is to be automatically dialed, then the telephone number location is entered (n) and the DIAL button is pressed. In response, the wallet displays and dials the telephone number at box 336 and connects. At box 338 the RESET button may be pressed to disconnect the telephone call.

After having thus described my invention and the manner of its use, it should be apparent that incidental changes may be made thereto that fairly fall within the scope of the following appended claims, wherein I claim:

1. An electronic money storage and transfer system wherein at least electronic money is transferable between a centralized repository of money containing at least one financial account accessible by an account identification number and a portable electronic wallet, said wallet being independently connectable to other money storage and electronic money transfer devices so that electronic money may be transferred between said portable electronic wallet and said other money storage and electronic money transfer devices, said system comprising:

means, in a financial institution, for electronically transferring said electronic money between said financial institution and said portable electronic wallet, said portable electronic wallet comprising:

a first set of memory locations for storing said account identification number, a second set of memory locations for storing said electronic money transferred from said financial institution to said portable electronic wallet, a modem incorporated in said portable electronic wallet for accessing said financial account in said financial institution, and utilizing said account identification number stored in said first memory locations for storing said account identification number to transfer a selected quantity of said electronic money from said financial account in said financial institution into said second set of memory locations of said portable electronic wallet, a telecommunications receptacle for receiving a telecommunications plug for connecting said portable electronic wallet directly to said other electronic money storage and electronic money transfer devices and transferring said electronic money therebetween without connection to said financial institution, and interface means for interfacing with said first set of memory locations, said second set of memory locations, and said means for connecting said portable electronic wallet to said other electronic storage and electronic money transfer devices.

2. A system as set forth in claim 1 wherein a transaction record associated with a money transaction is transferred to said other money storage and electronic money transfer devices.

3. A system as set forth in claim 2 wherein said transaction record is in the form of a check record transferrable to said financial institution and to said other money storage and electronic money transfer devices upon connection thereto.

4. A system as set forth in claim 3 wherein all said check records are transferred to said centralized repository of money for maintaining a record of said check records.

5. A system as set forth in claim 3 wherein a said check record and electronic money associated therewith may be transferred to another said electronic money storage and electronic money transfer device.

6. A system as set forth in claim 1 wherein said modem in said electronic wallet is couplable by said telecommunications receptacle to other money storage and electronic money transfer devices by said telecommunications plug for transferring said electronic money therebetween without connection to said financial institution.

7. A system as set forth in claim 6 wherein when said portable electronic wallet is connected telephonically by said telecommunications receptacle and said telecommunications plug, said wallet is at least partially electrically powered by current from said telephone lines.

8. A system as set forth in claim 1 wherein quantities of time and quantities of a substance may be purchased directly by providing a tone indicative of a purchased said quantity of time and a purchased quantity of a substance through said receptacle and said plug to said portable electronic wallet.

9. A system as set forth in claim 1 wherein two said electronic wallets may be coupled together, and at least electronic money transferred therebetween.

10. A system as set forth in claim 1 further comprising a third set of memory locations in said portable electronic wallet for storing a predetermined amount of credit, and wherein said first memory locations further include memory locations for storing a credit account number, for accessing a credit account and transferring credit to said third set of memory locations.

11. A system as set forth in claim 10 including control instructions for rendering said portable electronic wallet incapable of performing financial operations if said electronic money and said credit is exhausted.

12. An electronic wallet as set forth in claim 1 wherein said money storage and electronic money transfer devices include cash registers.

13. A battery powered electronic wallet conveniently sized for carrying in a pocket, said electronic wallet enabling transfer of money transactions as a stand-alone financial entity without connection to a financial institution, said electronic wallet comprising:

an electronic microcomputer further comprising a plurality of program memory locations for storing a computer program containing computer instructions for conducting a plurality of types of electronic money transactions, a first plurality of erasable programmable memory locations for storing a selected quantity of electronic money transferred from said financial institution, a second plurality of erasable programmable memory locations for storing at least one account number of a financial account in said financial institution, said financial account accessible by said electronic wallet, a modem responsive to said microcomputer for connecting said electronic wallet to a communications device, a liquid crystal display responsive to said microcomputer for displaying at least information related to said electronic money transactions, a keypad for allowing interface with said microcomputer, telephone line interface circuitry, including a hook switch, for enabling connection to a telephone line, said interface circuitry further comprising a current regulator, voltage regulator, and bridge rectifier for utilizing power from said telephone line when said electronic wallet is coupled to said telephone line, security means requiring an access key code to gain access to all electronic money and account access functions, means for telephonically coupling said electronic wallet, independently of said financial institution, directly to other electronic devices capable of exchanging electronic money, whereby a user of said electronic wallet may transfer said selected quantity of electronic money to said electronic wallet from said financial institution and thereafter use stored said selected quantity of electronic money in said electronic wallet to make purchases and otherwise transfer money without connection to said financial institution.

14. An electronic wallet as set forth in claim 13 further comprising analog communications circuitry responsive to said microcomputer and said modem for enabling a user of said electronic wallet to communicate telephonically.

15. An electronic wallet as set forth in claim 13 further comprising circuitry responsive to tones indicative of time and quantity, for purchasing increments of time and quantities of a substance.

16. An electronic wallet as set forth in claim 13 further comprising a third plurality of erasable memory storage registers for storing a selected amount of financial credit from at least one credit source, for enabling purchases up to a limit of said credit.

17. An electronic wallet as set forth in claim 16 wherein said electronic wallet further comprises means for blocking purchases or transferring electronic money from a said electronic wallet if there is not sufficient electronic money and credit to cover said purchase or transfer.

18. An electronic wallet as set forth in claim 13 further comprising a spare set of erasable programmable memory locations for storing data in said electronic wallet entered from said keypad.

19. An electronic wallet as set forth in claim 13 wherein said first plurality of erasable programmable memory locations include memory locations for storing a check record, said check record and electronic money associated therewith being transferrable to another electronic money storage and electronic money transfer device, and further being transferrable to said financial institution.

20. An electronic wallet as set forth in claim 13 wherein said other electronic devices capable of exchanging electronic money include cash registers.

* * * * *